United States Patent
Suzuki

(10) Patent No.: US 9,866,728 B2
(45) Date of Patent: Jan. 9, 2018

(54) INFORMATION PROCESSING APPARATUS, IMAGE FORMING APPARATUS, INFORMATION PROCESSING METHOD AND NON-TRANSITORY COMPUTER READABLE MEDIUM THAT CONTROL NEAR FIELD COMMUNICATION UNITS

(71) Applicant: FUJI XEROX CO., LTD., Tokyo (JP)

(72) Inventor: Tatsuro Suzuki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/198,474

(22) Filed: Jun. 30, 2016

(65) Prior Publication Data

US 2017/0272614 A1 Sep. 21, 2017

(30) Foreign Application Priority Data

Mar. 18, 2016 (JP) .................................. 2016-055524

(51) Int. Cl.
*G06F 3/12* (2006.01)
*H04N 1/44* (2006.01)
*H04N 1/00* (2006.01)

(52) U.S. Cl.
CPC ....... *H04N 1/4413* (2013.01); *H04N 1/00204* (2013.01); *H04N 1/00307* (2013.01);
(Continued)

(58) Field of Classification Search
None
See application file for complete search history.

(56) References Cited

U.S. PATENT DOCUMENTS 9,164,712 B2 10/2015 Kaigawa
2009/0036056 A1* 2/2009 Oshima ............... H04M 1/7253
455/41.3
(Continued)

FOREIGN PATENT DOCUMENTS

EP 2916469 A1 9/2015
JP 2015-069458 A 4/2015

OTHER PUBLICATIONS

Jul. 28, 2017 Search Report issued in European Patent Application No. 16182340.6.

*Primary Examiner* — Thomas D Lee
(74) *Attorney, Agent, or Firm* — Oliff PLC

(57) ABSTRACT

An information processing apparatus includes a first near field communication unit that transmits a first wireless signal for performing first near field communication; a second near field communication unit that transmits a second wireless signal for performing second near field communication; and a communication control unit that controls the first and second near field communication units such that the first wireless signal and the second wireless signal are alternately transmitted, identification information of a user is acquired from a terminal device via the first near field communication when connection via the first near field communication is established in response to transmitting the first wireless signal, and identification information of the information processing apparatus is transmitted to the terminal device via the second near field communication when connection via the second near field communication is established in response to transmitting the second wireless signal.

14 Claims, 2 Drawing Sheets

(52) U.S. Cl.
CPC .............. *H04N 2201/006* (2013.01); *H04N 2201/0094* (2013.01)

(56) References Cited

U.S. PATENT DOCUMENTS

| | | | |
|---|---|---|---|
| 2015/0092225 A1 | 4/2015 | Kaigawa | |
| 2015/0277823 A1 | 10/2015 | Nakayama | |
| 2015/0327172 A1 | 11/2015 | Kusakabe | |
| 2016/0065759 A1* | 3/2016 | Sakaguchi | H04N 1/00307 358/1.15 |
| 2016/0065761 A1* | 3/2016 | Honda | H04N 1/00342 358/1.15 |

\* cited by examiner

INFORMATION PROCESSING APPARATUS, IMAGE FORMING APPARATUS, INFORMATION PROCESSING METHOD AND NON-TRANSITORY COMPUTER READABLE MEDIUM THAT CONTROL NEAR FIELD COMMUNICATION UNITS

CROSS-REFERENCE TO RELATED APPLICATIONS

This application is based on and claims priority under USC 119 from Japanese Patent Application No. 2016-055524, filed on Mar. 18, 2016.

BACKGROUND

Technical Field

The present invention relates to an information processing apparatus, an image forming apparatus, an information processing method, and a non-transitory computer readable medium.

SUMMARY

According to an aspect of the invention, there is provided an information processing apparatus, including: a first near field communication unit that transmits a first wireless signal for performing first near field communication; a second near field communication unit that transmits a second wireless signal for performing second near field communication; and a communication control unit that controls the first and second near field communication units such that the first wireless signal and the second wireless signal are alternately transmitted, identification information of a user is acquired from a terminal device via the first near field communication when connection via the first near field communication is established in response to transmitting the first wireless signal, and identification information of the information processing apparatus is transmitted to the terminal device via the second near field communication when connection via the second near field communication is established in response to transmitting the second wireless signal.

BRIEF DESCRIPTION OF DRAWINGS

Exemplary embodiment(s) of the present invention will be described in detail based on the following figures, wherein.

DETAILED DESCRIPTION

Figure 1:
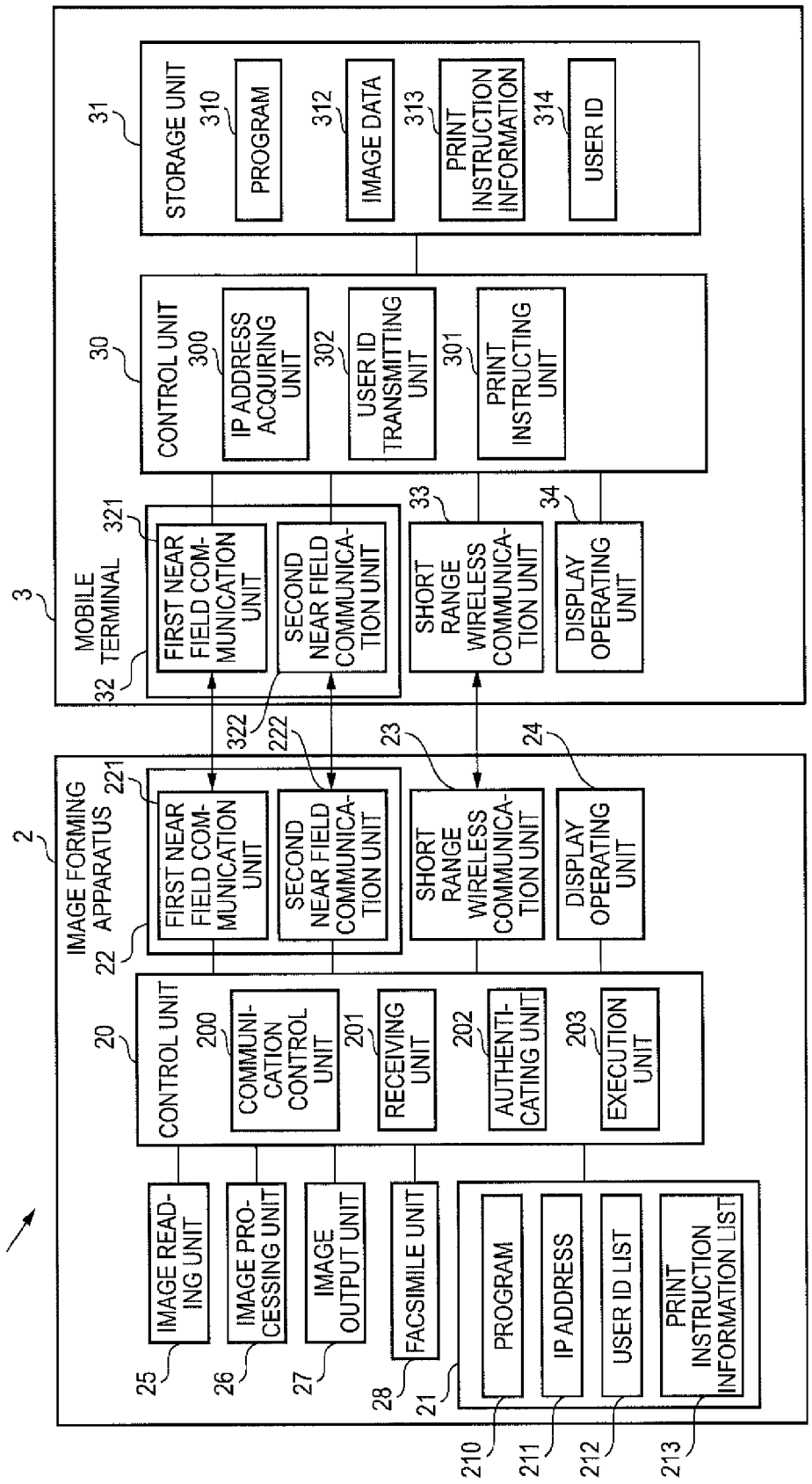
FIG. 1 is a block diagram functionally illustrating an exemplary configuration of an information processing system according to an exemplary embodiment of the present invention.

Hereinafter, an exemplary embodiment of the present invention will be described with reference to the appended drawings. In the drawings, components having substantially the same function are denoted by the same reference numerals, and a duplicated description will be omitted. In the exemplary embodiment, an image processing apparatus will be described as an exemplary information processing apparatus, but the information processing apparatus may be any other information processing apparatus.

FIG. 1 is a block diagram functionally illustrating an exemplary configuration of an information processing system according to an exemplary embodiment of the present invention. An information processing system 1 is configured such that an image forming apparatus 2 and a mobile terminal 3 are connected so that wireless communication can be performed therebetween. The mobile terminal 3 is an exemplary terminal device of the user.

(Configuration of Image Forming Apparatus)

The image forming apparatus 2 is a multifunction device having a plurality of functions such as a copy function, a scanning function, a printing function, and a facsimile function, and includes a control unit 20 that controls respective units of the image forming apparatus 2. A storage unit 21, a near field communication unit 22, a short range wireless communication unit 23, a display operating unit 24, an image reading unit 25, an image processing unit 26, an image output unit 27, and a facsimile unit 28 are connected to the control unit 20.

The near field communication unit 22 includes a first near field communication unit 221 that transmits a first wireless signal for performing first near field communication and a second near field communication unit 222 that transmits a second wireless signal for performing second near field communication.

The first near field communication unit 221 performs the first near field communication. The distance, between the first near field communication unit 221 and a first near field communication unit 321 of the mobile terminal 3, in which the first near field communication unit 221 can communicate with the first near field communication unit 321 is about 10 cm or less, for example. As such communication, in the exemplary embodiment, wireless communication in which, for example, communication with a non-contact IC card defined in the NFC forum can be performed is used. Examples of the non-contact IC card defined in the NFC forum include Type A and Type B specified in the international standard ISO/IEC 14443 and FeliCa (a registered trademark) specified in the Japanese industrial standard JIS X6319-4. For the first near field communication, a communication protocol that is executed in the reader/writer mode and different from that of the second near field communication is used.

The second near field communication unit 222 performs the second near field communication. The distance, between the second near field communication unit 222 and a second near field communication unit 322 of the mobile terminal 3, in which the second near field communication unit 222 can communicate with the second near field communication unit 322 is about 10 cm or less, for example. As such communication, in the exemplary embodiment, NFC communication in which the P2P mode can be enabled is used. For the second near field communication, a communication protocol that is executed in the P2P mode and different from that of the first near field communication is used.

The storage unit 21 is implemented by a read only memory (ROM), a random access memory (RAM), a hard disk, or the like, and stores a program 210, an IP address 211 allocated to its own apparatus, a user ID list 212, a print instruction information list 213, and the like. Here, the IP address 211 is exemplary identification information of the image forming apparatus 2. A user ID accessible to the image forming apparatus 2 is registered in the user ID list 212 in advance. Here, the user ID is exemplary identification information of the user. When the mobile terminal 3 uses an individual identification number, the user ID and the individual identification number are included in the user ID list 212. The storage unit 21 may not store the user ID list 212. In this case, for example, a server stores the user ID list 212, and the image forming apparatus 2 transmits a user authentication request to the server via a network. The program 210 is an exemplary information processing program.

When the near field communication unit 22 and a near field communication unit 32 of the other party are within a communicable distance (for example, when a distance between antennas is about 10 cm or less), a connection via the first or second near field communication is established. Further, in the state in which the near field communication unit 22 and the near field communication unit 32 of the other party are within the communicable distance, and thus the connection is established, when the near field communication unit 32 of the other party deviates from the communicable distance, the connection via the first or second near field communication is disconnected.

The short range wireless communication unit 23 performs short range wireless communication with a short range wireless communication unit 33 of the mobile terminal 3 within a communicable distance larger than that of the near field communication unit 22, for example, a distance of about 100 m or less. As such communication, for example, a wireless local area network (LAN) with intervention of a LAN router such as a wireless fidelity (Wi-Fi) or wireless communication with no intervention of a LAN router such as Wi-Fi Direct or Bluetooth (a registered trademark) may be used. For the short range wireless communication unit 23, a communication protocol different from that of the near field communication unit 22 is used.

The display operating unit 24 includes a touch panel display in which a touch panel is superimposed on a display unit such as a liquid crystal display, and causes an operation screen to be displayed on the display unit and receives an operation on the touch panel from an operator.

The image reading unit 25 is configured, for example, with a scanner, and reads and receives image data from an original. The image processing unit 26 performs image processing such as compression, decompression, and synthesis on the image data input from the image reading unit 25 or the like. The image output unit 27 includes, for example, an image holding member by a photoconductor, forms an image on a recording medium such as a sheet, and outputs the resulting medium. The facsimile unit 28 performs modulation and demodulation on data according to a facsimile protocol such as G3 or G4, and performs facsimile communication via a telephone line.

The control unit 20 is configured with a central processing unit (CPU), an interface, and the like. The CPU operates according to a program 10 stored in the storage unit 21 and thus functions as a communication control unit 200, a receiving unit 201, an authenticating unit 202, an execution unit 203, and the like and executes the reader/writer mode and the P2P mode.

The communication control unit 200 controls the first and second near field communication units 221 and 222 such that the first wireless signal and the second wireless signal are alternately transmitted, the user ID 314 is acquired from the mobile terminal 3 via the first near field communication when the connection via the first near field communication is established by transmission of the first wireless signal, the IP address 211 is read from the storage unit 21 when the connection via the second near field communication is established in response to transmitting the second wireless signal, and the IP address 211 is transmitted to the mobile terminal 3 via the second near field communication.

When the short range wireless communication unit 23 establishes a connection via short range wireless communication with the short range wireless communication unit 33 of the mobile terminal 3, the receiving unit 201 receives print instruction information 313 to instruct printing of data from the mobile terminal 3 through the short range wireless communication unit 23. The receiving unit 201 transfers the received print instruction information 313 to the execution unit 203.

When the communication control unit 200 acquires a user ID 314, the authenticating unit 202 performs an authentication process based on the acquired user ID 314. Specifically, the authenticating unit 202 determines whether the user ID 314 is registered in the user ID list 212 of the storage unit 21, and notifies the execution unit 203 of an authentication result. The authentication process may be performed based on the directly input user ID when the user ID is directly input by an operation on the display operating unit 24. The authenticating unit 202 may perform the user authentication based on a user ID and a password.

The execution unit 203 performs a printing process according to the print instruction information 313 transferred from the receiving unit 201. In other words, the execution unit 203 controls the image output unit 27 such that the data is printed under a printing condition set based on the print instruction information 313. The image output unit 27 prints the data on a recording medium such as a sheet under the printing condition set based on the print instruction information 313. The execution unit 203 may control the image processing unit 26 or the facsimile unit 28 to perform a process depending on instruction information transferred from the receiving unit 201.

The execution unit 203 performs the printing process when the authentication by the authenticating unit 202 succeeds but rejects the printing process when the authentication has failed.

Some or all of the communication control unit 200, the receiving unit 201, the authenticating unit 202, and the execution unit 203 may be configured with a hardware circuit such as a field programmable gate array (FPGA) or an application specific integrated circuit (ASIC).

(Configuration of Mobile Terminal)

The mobile terminal 3 includes a control unit 30 that controls respective units of the mobile terminal 3. A storage unit 31, the near field communication unit 32, the short range wireless communication unit 33, and a display operating unit 34 are connected to the control unit 30. The mobile terminal 3 may be a personal computer, a tablet type computer, a multi-functional telephone (smart phone), a mobile phone, or the like.

The storage unit 31 is implemented by a ROM, a RAM, a hard disk, or the like, and stores a program 310, image data 312, the print instruction information 313, the user ID 314, and the like. The user ID 314 is exemplary identification information of the user.

The near field communication unit 32 includes the first near field communication unit 321 that transmits the first wireless signal for performing the first near field communication and the second near field communication unit 322 that transmits the second wireless signal for performing the second near field communication. The first near field communication unit 321 performs the first near field communication with the first near field communication unit 221 of the image forming apparatus 2, and has the same function as the first near field communication unit 221 of the image forming apparatus 2. The second near field communication unit 322 performs the second near field communication with the second near field communication unit 222 of the image forming apparatus 2, and has the same function as the second near field communication unit 222 of the image forming apparatus 2.

The short range wireless communication unit 33 performs the short range wireless communication with the short range wireless communication unit 23 of the image forming apparatus 2, and has the same function as the short range wireless communication unit 23 of the image forming apparatus 2.

The display operating unit 34 includes a touch panel display in which a touch panel is superimposed on a display unit such as a liquid crystal display, and causes an operation screen to be displayed on the display unit and receives an operation on the touch panel from an operator.

The control unit 30 is configured with a CPU, an interface, and the like. The CPU operates according to a program 310 stored in the storage unit 31 and thus functions as an IP address acquiring unit 300, a print instructing unit 301, a user ID transmitting unit 302, and the like and executes the CE mode and the P2P mode.

When the second near field communication unit 322 establishes the connection via the second near field communication with the second near field communication unit 222 of the image forming apparatus 2, the IP address acquiring unit 300 acquires the IP address 211 of the image forming apparatus 2 through the second near field communication unit 322. The IP address acquiring unit 300 notifies the print instructing unit 301 of the acquired IP address 211.

The print instructing unit 301 transmits the print instruction information 313 to instruct printing of the image data to the image forming apparatus 2 of the corresponding IP address 211 through the short range wireless communication unit 33 using the IP address 211 acquired by the IP address acquiring unit 300 as a transmission destination.

When the first near field communication unit 221 establishes the connection via the first near field communication with the first near field communication unit 321 of the mobile terminal 3, the user ID transmitting unit 302 reads the user ID 314 from the storage unit 31 and transmits the user ID 314 from the first near field communication unit 321 to the image forming apparatus 2.

Some or all of the IP address acquiring unit 300, the print instructing unit 301 and the user ID transmitting unit 302 may be configured with a hardware circuit such as an FPGA or an ASIC. The IP address acquiring unit 300 and the user ID transmitting unit 302 may be executed by an operating system (OS), and the print instructing unit 301 may be executed by application software.

(Operation of Information Processing System)

Figure 2:
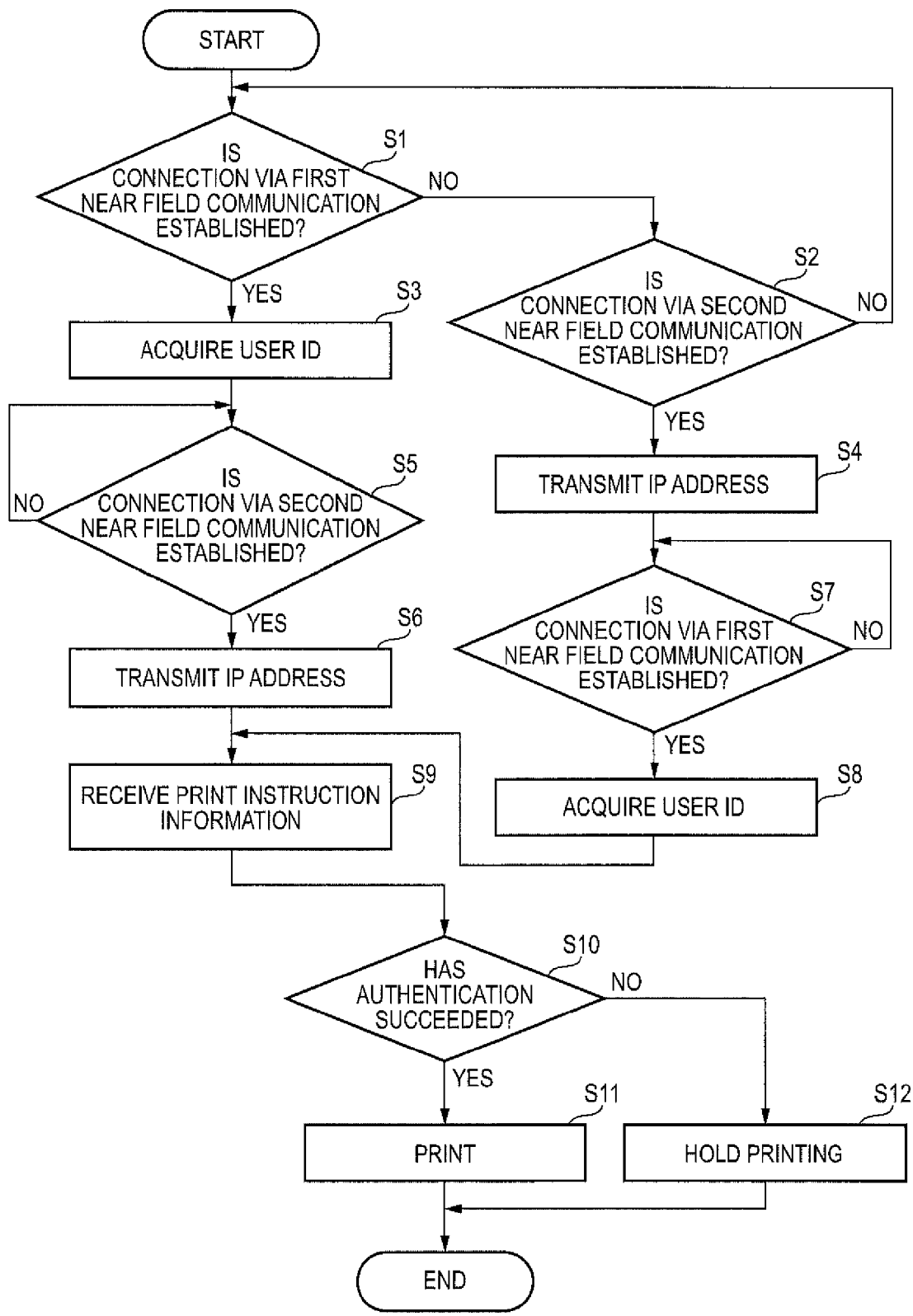
FIG. 2 is a flowchart illustrating an exemplary operation of an image forming apparatus.

Next, an exemplary operation of the information processing system 1 will be described with reference to FIG. 2. FIG. 2 is a flowchart illustrating an exemplary operation of the image forming apparatus 2.

(1) Generation of Print Instruction Information

First, the user operates the display operating unit 34 of the mobile terminal 3 to display the print setting screen. Then, the user operates the print setting screen to select the image data 312 as a file to be printed from the image data 312 stored in the storage unit 31.

Then, the user sets the printing condition for the selected image data 312 such as a color/monochrome, the number of sheets to be printed, and the like. The print instructing unit 301 generates the print instruction information 313 for giving an instruction to print the selected image data 312 under the set printing condition, and stores the print instruction information 313 in the storage unit 31. For example, by displaying the selected image data to be displayed on the display operating unit 34, the print instructing unit 301 causes the mobile terminal 3 to enter a standby state for the near field communication and enables the CE mode and the P2P mode to be executable. A method of causing the mobile terminal to enter the standby state for the near field communication is not limited to the method of causing the selected image data to be displayed on the display operating unit 34, and it is desirable that it be in the state in which the image data is selected, and the printing condition is set.

(2) Acquisition of User ID and Transmission of IP Address

The first and second near field communication units 221 and 222 of the image forming apparatus 2 periodically transmits the first or second wireless signal and determines the presence or absence of a communication target. When the near field communication unit 32 of the mobile terminal 3 is brought close to (passed over) the near field communication unit 22 of the image forming apparatus 2 in the state in which the image data selected by the user is displayed on the display operating unit 34. When the mobile terminal 3 is consecutively detected twice or more, the first or second the near field communication unit 221 or 222 of the near field communication unit 22 of the image forming apparatus 2 establishes the connection via the first or second near field communication with the first or second near field communication unit 321 or 322 of the near field communication unit 32 of the mobile terminal 3 (S1 and S2). Which connection via the first or second near field communication is first established depends on the timing.

When the first near field communication unit 221 establishes the connection via the first near field communication with the first near field communication unit 321 of the mobile terminal 3 (Yes in S1), the user ID transmitting unit 302 of the mobile terminal 3 reads the user ID 314 from the storage unit 31, and transmits the user ID 314 to the image forming apparatus 2 through the first near field communication unit 321. The communication control unit 200 of the image forming apparatus 2 acquires the user ID 314 from the mobile terminal 3 via the first near field communication (S3). The communication control unit 200 transmits the user ID 314 to the authenticating unit 202 so that the authentication process is performed.

On the other hand, when the second near field communication unit 222 establishes the connection via the second near field communication with the second near field communication unit 322 of the mobile terminal 3 (Yes in S2), the communication control unit 200 reads the IP address 211 from the storage unit 21, and transmits the IP address 211 to the mobile terminal 3 through the second near field communication unit 222 (S4).

After the communication control unit 200 acquires the user ID in step S3 (S3), when the second near field communication unit 222 establishes the connection via the second near field communication with the second near field communication unit 322 of the mobile terminal 3 (Yes in S5), the communication control unit 200 reads the IP address 211 from the storage unit 21 and transmits the IP address 211 to the mobile terminal 3 through the second near field communication unit 222, similarly to step S4 (S6).

After the communication control unit 200 transmits the IP address 211 to the mobile terminal 3 in step S4 (S4), when the first near field communication unit 221 establishes the first near field communication with the first near field communication unit 321 of the mobile terminal 3 (Yes in S7), the communication control unit 200 acquires the user ID 314, similarly to step S3 (S8).

When the IP address 211 is acquired from the image forming apparatus 2 in S4 and S6, the IP address acquiring unit 300 of the mobile terminal 3 notifies the print instructing unit 301 of the acquired IP address 211.

(3) Reception of Print Instruction Information

The print instructing unit 301 performs control such that the print instruction information 313 is transmitted from the short range wireless communication unit 33 to the image forming apparatus 2 using the reported IP address 211 as the transmission destination. When the short range wireless communication unit 33 establishes the connection via the short range wireless communication with the short range wireless communication unit 23, the print instruction information 313 is transmitted to the short range wireless communication unit 23 of the image forming apparatus 2. The receiving unit 201 receives the print instruction information 313 from the mobile terminal 3 through the short range wireless communication unit 23 (S9).

(4) User Authentication

When the user ID is acquired (S3 and S8), the authenticating unit 202 initiates the authentication process. In other words, it is determined whether or not the acquired user ID 314 is registered in the user ID list 212 of the storage unit 21. When the acquired user ID 314 is registered in the user ID list 212 of the storage unit 21, a notification of an authentication result indicating that the authentication has succeeded is given to the execution unit 203. When the acquired user ID 314 is not registered in the user ID list 212 of the storage unit 21, a notification of an authentication result indicating that the authentication has failed is given to the execution unit 203.

If the authentication has succeed (Yes in S10), the execution unit 203 controls the image output unit 27 such that the image data is printed on the recording medium under the printing condition set by the print instruction information 313 (S11). If the authentication has not succeeded (No in S10), the execution unit 203 holds execution of the printing process according to the print instruction information 313 (S12).

First Modified Example

In the exemplary embodiment described above, after the user ID is acquired, if the authentication has not succeeded (No in S10), printing is put on hold (S12). However, when the authentication succeeds through any other means, printing may be performed. For example, the near field communication may be enabled, the user ID may be acquired from the non-contact IC card, and then the authentication may be performed again. Alternatively the user ID (and the password) may be input by operating the display operating unit 24, and then the authentication may be performed again.

Second Modified Example

In the exemplary embodiment described above, after the second near field communication is successfully established (Yes in S2), when the first near field communication fails to be established (No in S7), the process does not proceed to a next process (S8). However, when the authentication succeeds through any other means, printing may be performed. For example, the near field communication may be enabled, the user ID may be acquired from the non-contact IC card, and then the authentication may be performed. Alternatively the user ID and the password may be input by operating the display operating unit 24, and then the authentication may be performed.

Third Modified Example

In the exemplary embodiment described above, after the first near field communication is successfully established (S3), the second near field communication is continued regardless of whether the authentication has succeeded (S5, S6, and S9). However, when the authentication does not succeed, the second near field communication (S5) may be stopped.

Fourth Modified Example

In the exemplary embodiment described above, after the connection via the second near field communication is established (Yes in S2), even when the IP address is not actually transmitted (S4), the IP address is regarded as having been transmitted, and an attempt to establish the connection via the first near field communication is made (S7). However, when the IP address is not transmitted, although the user ID is acquired (S8), the authentication process may not be performed.

Fifth Modified Example

In the exemplary embodiment described above, the authentication is performed by passing the mobile terminal 3 over the image forming apparatus 2. However, for example, when the authentication is performed by passing the non-contact IC card over the image forming apparatus 2, the authentication process performed by passing the mobile terminal 3 over the image forming apparatus 2 and the acquisition of the user ID (S3 and S8) may be omitted, and only the second near field communication (S2 and S5) may be performed.

Sixth Modified Example

In the exemplary embodiment described above, a priority is given to none of the first near field communication and the second near field communication. However, when the image forming apparatus 2 performs the authentication process as in the exemplary embodiment, since the authentication process can be performed more rapidly than the acquisition of the print instruction information, selection may be performed so that the priority is given to the second near field communication. As a result, it is possible to perform the authentication process in parallel while acquiring the print instruction information, and it is possible to reduce the whole processing time.

Seventh Modified Example

In the exemplary embodiment described above, the print instruction information 313 is transmitted through the short range wireless communication unit 33 since high-speed communication can be performed. However, for example, in a case where an amount of data is small, the print instruction information 313 may be transmitted through the near field communication unit 32.

Eighth Modified Example

In the exemplary embodiment described above, image data has been described as a file to be printed. However data that can be dealt with by the mobile terminal 3 such as a text, a PDF, or a web page may be set as a file to be printed.

Further, in the flow of the exemplary embodiment, for example, a step may be added, deleted, changed, or exchanged within the scope not departing from the gist of the present invention.

Moreover, the program used in the exemplary embodiment may be recorded in a computer readable recording medium such as a CD-ROM and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
    a first near field communication unit that transmits a first wireless signal for performing first near field communication;
    a second near field communication unit that transmits a second wireless signal for performing second near field communication; and
    a processor configured to act as a communication control unit that controls the first and second near field communication units such that the first wireless signal and the second wireless signal are alternately transmitted, identification information of a user is acquired from a terminal device via the first near field communication when connection via the first near field communication is established in response to transmitting the first wireless signal, and identification information of the information processing apparatus is transmitted to the terminal device via the second near field communication when connection via the second near field communication is established in response to transmitting the second wireless signal.

2. The information processing apparatus according to claim 1, further comprising:
    a wireless communication unit that performs wireless communication that differs from the first and second near field communication in a communication protocol, wherein
    the processor is further configured to act as
        an authenticating unit that performs an authentication based on the identification information of the user acquired by the communication control unit,
        a receiving unit that receives print instruction information to instruct printing of data from the terminal device through the wireless communication unit, and
        an execution unit that performs a printing process according to the print instruction information received by the receiving unit when the authentication by the authenticating unit succeeds.

3. The information processing apparatus according to claim 2,
    wherein, when the authentication by the authenticating unit based on the identification information of the user acquired from the terminal device does not succeed, the execution unit performs the printing process when the authentication by the authenticating unit based on the identification information of the user acquired from a non-contact card of the user via the first near field communication or based on the identification information of the user that is directly input to the information processing apparatus succeeds.

4. The information processing apparatus according to claim 2,
    wherein, in a case where the communication control unit does not transmit the identification information of the information processing apparatus to the terminal device, the authenticating unit does not perform the authentication even when the identification information of the user is acquired.

5. The information processing apparatus according to claim 2,
    wherein the communication control unit stops the second near field communication when the authentication based on the identification information of the user acquired via the first near field communication does not succeed.

6. The information processing apparatus according to claim 1,
    wherein the communication control unit establishes the connection via the second near field communication more preferentially than the connection via the first near field communication.

7. An image forming apparatus, comprising:
    a first near field communication unit that transmits a first wireless signal for performing first near field communication;
    a second near field communication unit that transmits a second wireless signal for performing second near field communication; and
    a processor configured to act as a communication control unit that controls the first and second near field communication units such that the first wireless signal and the second wireless signal are alternately transmitted, identification information of a user is acquired from a terminal device via the first near field communication when a connection via the first near field communication is established in response to transmitting the first wireless signal, and identification information of the image forming apparatus is transmitted to the terminal device via the second near field communication when a connection via the second near field communication is established in response to transmitting the second wireless signal.

8. The image forming apparatus according to claim 7, further comprising
    a wireless communication unit that performs wireless communication that differs in a communication protocol from the first and second near field communication, wherein
    the processor is further configured to act as
        an authenticating unit that performs an authentication based on the identification information of the user acquired by the communication control unit,
        a receiving unit that receives print instruction information to instruct printing of data from the terminal device via the wireless communication unit, and
        an execution unit that performs a printing process according to the print instruction information received by the receiving unit when the authentication by the authenticating unit succeeds.

9. The image forming apparatus according to claim 8,
    wherein, when the authentication by the authenticating unit based on the identification information of the user acquired from the terminal device does not succeed, the execution unit performs the printing process when the authentication by the authenticating unit based on the identification information of the user acquired from a non-contact card of the user via the first near field communication or based on the identification information of the user that is directly input to the image forming apparatus succeeds.

10. The image forming apparatus according to claim 8, wherein, in a case where the communication control unit does not transmit the identification information of the image forming apparatus to the terminal device, the authenticating unit does not perform the authentication even when the identification information of the user is acquired.

11. The image forming apparatus according to claim 8, wherein the communication control unit stops the second near field communication when the authentication based on the identification information of the user acquired via the first near field communication does not succeed.

12. The image forming apparatus according to claim 7, wherein the communication control unit establishes the connection via the second near field communication more preferentially than the connection via the first near field communication.

13. An information processing method comprising:
controlling a first near field communication unit that transmits a first wireless signal for performing first near field communication and a second near field communication unit that transmits a second wireless signal for performing second near field communication such that the first wireless signal and the second wireless signal are alternately transmitted;
acquiring identification information of a user from a terminal device via the first near field communication when a connection via the first near field communication is established in response to transmitting the first wireless signal; and
transmitting own identification information to the terminal device via the second near field communication when a connection via the second near field communication is established in response to transmitting the second wireless signal.

14. A non-transitory computer readable medium storing a program causing a computer to function as:
a communication control unit that controls a first near field communication unit that transmits a first wireless signal for performing first near field communication and a second near field communication unit that transmits a second wireless signal for performing second near field communication,
wherein the communication control unit controls the first and second near field communication units such that the first wireless signal and the second wireless signal are alternately transmitted, identification information of a user is acquired from a terminal device via the first near field communication when a connection via the first near field communication is established in response to transmitting the first wireless signal, and identification information of the computer is transmitted to the terminal device via the second near field communication when a connection via the second near field communication is established in response to transmitting the second wireless signal.

* * * * *